R. DUNMYER.
ENVELOP FASTENER.
APPLICATION FILED MAR. 19, 1913.
1,095,562.
Patented May 5, 1914.
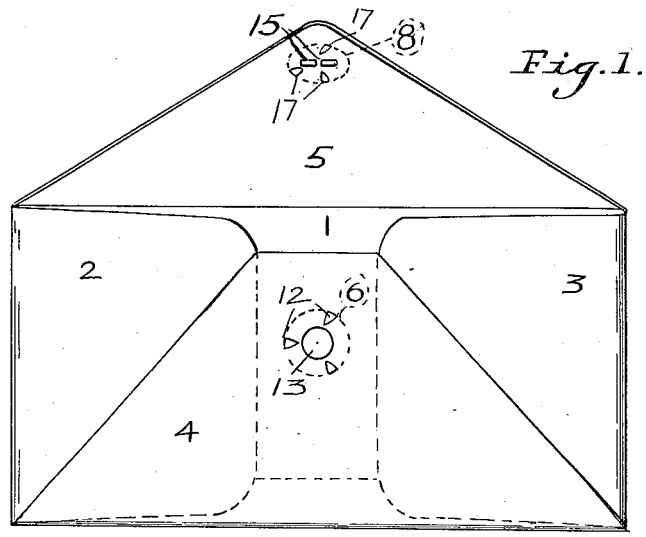
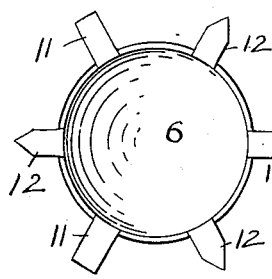
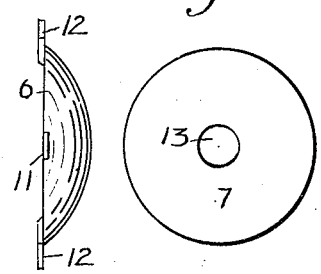
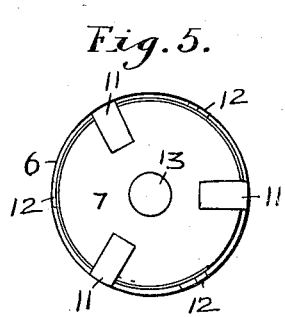
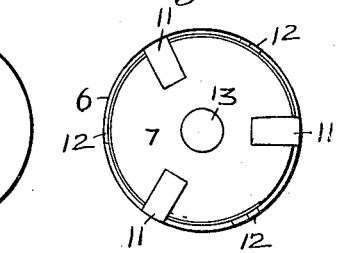
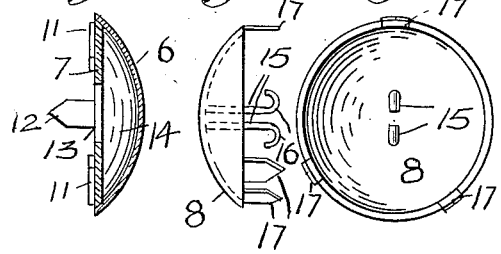
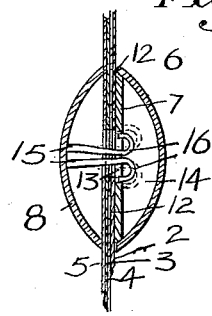
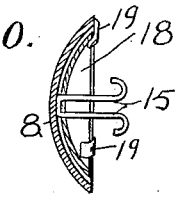

UNITED STATES PATENT OFFICE.

RUDOLPH DUNMYER, OF NEW BRIGHTON, PENNSYLVANIA.

ENVELOP-FASTENER.

1,095,562.                    Specification of Letters Patent.      Patented May 5, 1914.

Application filed March 19, 1913. Serial No. 755,538.

*To all whom it may concern:*

Be it known that I, RUDOLPH DUNMYER, a citizen of the United States, residing at New Brighton, in the county of Beaver and State of Pennsylvania, have invented new and useful Improvements in Envelop-Fasteners, of which the following is a specification.

My invention relates to fasteners for envelops, packages, boxes, and the like. The object thereof is to provide a novel means for sealing such articles and preventing the unsealing of the same without the tearing, breaking, or cutting of the said articles.

My invention is particularly adapted to sealed envelops. Envelops sealed with mucilage can be unsealed and resealed without leaving a sign by which the unsealing may be detected. With my fastener, the envelop must be mutilated before its contents can be removed.

Referring to the accompanying drawings, Figure 1 is a rear view of an envelop equipped with my fastener, the sealing flap being open. Fig. 2 is a rear view of the inner member of the section by which the end and bottom flaps of the envelop are fastened together; Fig. 3, an edge view of Fig. 2; Fig. 4, an elevation of the outer member of the said section; Fig. 5, a rear view of the said section; Fig. 6, a central cross-section of Fig. 5; Fig. 7, an edge view of the section of the fastener which is secured to the upper, or sealing, flap; Fig. 8, a view of Fig. 7, looking toward the left; Fig. 9, a view of the two sections of my fastener with the parts just ready to interlock; and Fig. 10, a central cross-section of a modification of Figs. 7 and 8.

On the drawings, 1 represents an envelop having the two end flaps 2 and 3 and the bottom flap 4 secured together by one section of my fastener. The sealing flap 5 of the envelop is provided with the other section of the fastener. The first named section is composed of the two members 6 and 7 and the other member is composed of a single section 8 in Figs. 6 to 8, and of two sections in Fig. 10.

The member 6 is made from a concaved disk of sheet metal provided with the fastening lugs 11 and 12. The member 7 comprises a metal disk having the central opening 13. The member 7 preferably fits in the concavity of the member 6 so that the outer face of the member 7 lies substantially flush with the periphery of the member 6, as shown on Fig. 6, leaving the space 14 between the members 6 and 7. The lugs 11 are turned down upon the outer face of the member 7 so as to secure the members 6 and 7 together, as a unit. The lugs 12 have their ends beveled and extending at right angles to the member 7 on that side of the said member 7 on which the lugs 11 lie. With the parts arranged as shown in Figs. 5 and 6, the lugs 12 are pushed from the inside of the envelop through the overlapping portions of the flaps 2, 3, and 4, and then bent down on the outer face of the envelop, or flap 4, as shown on Figs. 1 and 9.

The section 8 is a concaved disk of sheet metal, having a pair of spring catches 15 having one end of each secured centrally in any rigid manner to the concave side of the said section. I have shown the catches having their outer ends bent or curved outwardly away from each other and then backwardly so as to form cam surfaces, shown at 16, which are so arranged that the cams will engage the opposite sides of the opening 13 and force the catches toward each other, as shown in full lines on Fig. 9. When the cam-ends of the catches pass entirely through the opening 13, the catches spring apart to the dotted line position so that their recurved ends catch over the inner face of the member 7 as shown in dotted lines on Fig. 9.

The periphery of the member 8 is provided with the lugs 17 having beveled ends. The lugs 17 are pushed through the flap 5 from the outer face thereof so that the lugs 17 and the catches 15 project through the flap. The lugs 17 are bent down on the flap as shown on Fig. 1 in order to secure the flap 5 and the member 8 together.

The envelop 1 is sealed by bringing the flap 5 down on the back of the envelop and then pushing the fastener sections together so that the spring catches 15 will pass entirely through the opening 13 and the registering holes in the flaps 2, 3, and 4, until the catch interlocks with the member 7 in the manner already described.

In Fig. 10, the member 8 contains a concave member 18 nested therein, and secured therein by the lugs 19 carried by the member 8 and bent down on the member 18. The member 18 supports the spring catches 15 the same as the member 8 in Figs. 7 and 8 is shown supporting the spring catches.

It is evident that the lugs 11 might be omitted, but I prefer to use them because they enable me to assemble the members 6 and 7 before their shipment or use without liability of their becoming separated. In some cases all or some of the said lugs may be omitted, because the spring catches alone will hold the flaps together.

I reserve the right to cover such modifications of my invention as come within the scope of the appended claim when interpreted liberally.

I claim—

The combination with two members to be fastened together, of a two-part fastener, one part comprising a dished body and a series of lugs thereon, and a cover for the body, having an opening, some of the said lugs being bent down on the outer face of the cover and others of the said lugs extending through one of the said members and bent down thereon, and the other part comprising a body secured to the other member and provided with a pair of spring catches arranged to pass through the said opening and automatically interlock with the rear face of the cover by reason of their resiliency.

Signed at Pittsburgh, Pa., this 8th day of March, 1913.

RUDOLPH DUNMYER.

Witnesses:
F. N. BARBER,
ANNA R. BEATTY.

Copies of this patent may be obtained for five cents each, by addressing the "Commissioner of Patents, Washington, D. C."